United States Patent
Scheelen et al.

(10) Patent No.: US 6,904,940 B2
(45) Date of Patent: Jun. 14, 2005

(54) POLYETHYLENE PIPE

(75) Inventors: André Scheelen, Brussels (BE); Eric Vandevijver, Woluwe-Saint-Pierre (BE)

(73) Assignee: Solvay Polyolefins Europe-Belgium (S.A.), Brussels (BE)

(*) Notice: Subject to any disclaimer, the term of this patent is extended or adjusted under 35 U.S.C. 154(b) by 151 days.

(21) Appl. No.: 10/399,513

(22) PCT Filed: Oct. 16, 2001

(86) PCT No.: PCT/EP01/11927

§ 371 (c)(1),
(2), (4) Date: Apr. 17, 2003

(87) PCT Pub. No.: WO02/34513

PCT Pub. Date: May 2, 2002

(65) Prior Publication Data

US 2004/0103948 A1 Jun. 3, 2004

(30) Foreign Application Priority Data

Oct. 20, 2000 (EP) .............................................. 00203671

(51) Int. Cl.⁷ .............................................. F19L 11/00
(52) U.S. Cl. ..................... 138/137; 138/141; 428/36.91
(58) Field of Search ................................ 138/137, 141; 428/36.91

(56) References Cited

U.S. PATENT DOCUMENTS

| | | | | |
|---|---|---|---|---|
| 4,791,965 A | * | 12/1988 | Wynn | 138/146 |
| 6,378,563 B2 | * | 4/2002 | Genoni et al. | 138/137 |
| 6,441,096 B1 | * | 8/2002 | Backman et al. | 525/240 |
| 6,720,048 B2 | * | 4/2004 | Ohta et al. | 428/35.7 |
| 2002/0188086 A1 | * | 12/2002 | Ohta et al. | 526/348 |
| 2003/0096901 A1 | * | 5/2003 | Aarila et al. | 524/528 |
| 2004/0028860 A1 | * | 2/2004 | Dalal et al. | 428/36.91 |

FOREIGN PATENT DOCUMENTS

| | | |
|---|---|---|
| CH | 584 863 | 2/1977 |
| DE | 296 22 414 U1 | 5/1997 |
| EP | 0 869 304 A2 | 10/1998 |
| EP | 0 897 934 A1 | 2/1999 |
| WO | WO97/33116 | 9/1997 |

* cited by examiner

*Primary Examiner*—James Hook
(74) *Attorney, Agent, or Firm*—Finnegan, Henderson, Farabow, Garrett and Dunner, L.L.P.

(57) ABSTRACT

Multi-layered pipe comprising a main layer of polyethylene compound having a resistance to stress cracking NPT measured according to ISO 13479 standard of less than 8000 hours and an internal layer of polyethylene compound having a resistance to stress cracking NPT of higher than 8000 hours, the thickness of the internal layer being between 1 and 25% of the total pipe thickness but not less than 0.3 mm.

10 Claims, 1 Drawing Sheet

POLYETHYLENE PIPE

Figure 1:
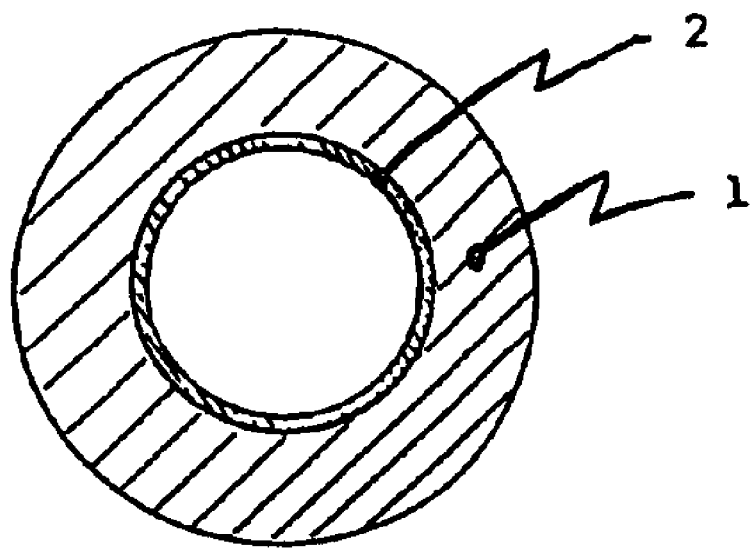

The present invention relates to polyethylene pipes, more particularly to pipes comprising at least two layers of different polyethylene compounds.

Polyethylene compounds are known for the production of pipes for the transport of fluids under pressure. Such pipes require high stiffness (creep rupture strength), combined with a high resistance against slow crack growth as well as resistance to crack propagation yielding impact toughness. Polyethylene pipes are widely used as they are lightweight and can be easily assembled by fusion welding. Polyethylene pipes also have a good flexibility and are corrosion free. Pipe compounds are known in the art which are referred to by the names "PE 80" and "PE 100". This classification is described in ISO 9080 and ISO 12162. These are polyethylene compounds which when used for the formation of pipes of specific dimensions, survive a long-term pressure test at different temperatures for a period of 10000 hours. Extrapolation shows that the pipes have a 20° C. 50 years stress resistance of, respectively, at least 8 and 10 MPa.

The polyethylene pipes made of these polyethylene compounds usually have a good resistance to stress cracking. However, when these known pipes are embedded in or posed on a soil comprising rocks and stones, scratching of the pipes can occur giving rise to crack growth. Moreover, point loads on the pipeline can occur by rock impingement and give also rise to crack growth. Hence, there is the need to improve the resistance against slow crack growth of the pipes while maintaining the other properties, and in particular the creep rupture strength at least at the required level.

Polyethylene pipes having a better resistance to scratching were proposed in the prior art. European patent application EP 0 869 304 discloses a coextruded two-layered pipe having an external layer of crosslinked polyethylene and an internal layer of a PE 80 or PE 100 polyethylene compound. The thickness of the external layer of reticulated polyethylene was adapted such that the scratches do not attain the internal polyethylene layer. DE 29622788 U1 further discloses a similar two-layered pipe wherein the external layer is a non reticulated polyethylene having an FNCT-value (Full Notched Creep Test) of at least 3 times the FNCT value of the inner polyethylene layer. The thickness of the external layer is at least 20%, preferably 25 to 35% of the total pipe thickness. When using for the external layer a bimodal ethylene-hexene copolymer, the two-layered pipe presents a high durability and scratch resistance during the installation of the pipe.

The two-layered pipes disclosed in the prior art still have the need to increase their resistance to stress cracking, in particular to increase their resistance to point loading. Moreover, the absence of good creep resistance and in particular the absence of MRS classification of the protective layer has as an effect that the design of the pipe can only take into account the contribution of the MRS classified material (i.e. 80% of the pipe wall thickness). Therefore an extra wall thickness is needed and hence, standard accessories such as fittings, cannot be used anymore for the installation of the pipes.

The present invention aims to overcome the disadvantages of the prior art, in particular by providing improved multi-layered polyethylene pipe.

The invention therefore relates to a multi-layered pipe comprising a main layer of polyethylene compound having a resistance to stress cracking NPT measured according to ISO 13479 standard of less than 8000 hours and an internal layer of polyethylene compound having a resistance to stress cracking NPT of higher than 8000 hours, the thickness of the internal layer being between 1 and 25% of the total pipe thickness but not less than 0.3 mm.

In the present invention, the resistance to stress cracking of the polyethylene compound was tested by a notched pipe test (NPT) in accordance with ISO 13479 (1996) under a stress of 4.6 MPa at 80° C. using pipes made of the compound, of 110 mm diameter having a thickness of 10 mm, hence a SDR value of 11 (SDR being the ratio of the pipe diameter to the pipe thickness).

In the pipes according to the invention, the polyethylene compound of the internal layer preferably has a resistance to stress cracking NPT as described here above of at least 10000 hours, more preferably of at least 12000 hours.

The polyethylene compound of the internal layer preferably also has a good creep resistance. The compounds used for the internal layer preferably have a creep resistance which is such that they can be assigned a minimum required strength (MRS) rating according to the ISO/TR 9080 standard which is at least the MRS 10 rating (also designed as PE100 resins). This rating is determined according to a statistical method and the minimum required strength MRS is defined as a classified lower prediction limit (LPL) at a 97.5% confidence interval.

Furthermore, the polyethylene compounds used for the internal layer of the pipes according to the invention preferably exhibit good resistance to rapid crack propagation. In order to assess resistance of the resins to rapid crack propagation (RCP), pipes having a diameter of 110 mm were subjected to the test according to ISO DIS 13477 (the small scale steady state (S4) test) at a pressure of 10 bars to determine the critical temperature of fracture. The compounds used in accordance with the invention preferably withstand a pressure of more than 10 bars at 0° C.

Preferably, the ethylene compounds used for the internal layer of the pipes in accordance with the invention exhibit a time to failure under the FNCT test specified in ISO DIS 16770 of at least 500 hours, most preferably of at least 1000 hours.

The polyethylene compound of the internal layer used in the pipe according to the invention generally comprises at least 95% by weight of a polyethylene resin having a broad molecular weight distribution, a melt index $MI_5$ of between 0.07 and 10 g/10 min and a density measured according to ASTM D 792 standard between 930 to 965 kg/m$^3$, preferably between 940 to 960 kg/m$^3$. Preferably, the polyethylene resin of the internal layer comprises from 30 to 70% by weight of an ethylene polymer having a density of at least 960 kg/m3 and an melt index $MI_2$ of at least 100 g/10 min and from 30 to 70% by weight of an ethylene copolymer comprising from 0.4 to 10 weight % of an alpha-olefin containing more than 5 carbon atoms (most preferably an ethylene-hexene copolymer), having a density between 910 and 938 kg/m$^3$ and a melt index $MI_5$ of between 0.01 to 2 g/10 min. In the present invention, the melt index $MI_2$ and $MI_5$ were measured according to ASTM D1238 (1986) standard at 190° C. and at 2.16 and 5 kg respectively.

The polyethylene compound used for the internal layer may also comprise the usual additives used in polyethylene pipe compounds, such as stabilisers (anti-oxidants and/or anti-UV), antistatic agents, processing aids and colorants. Advantageously, the ethylene compound used for the internal layer comprises less than 5% by weight of such additives.

The most preferred polyethylene compounds and resins used for the internal layer of the pipes according to the invention are described in European patent application EP 0 897 934.

The thickness of the internal polyethylene layer is preferably at least 3%, most preferably at least 6%, of the total pipe thickness. The thickness of the internal layer preferably does not exceed 15% of the total pipe thickness. The minimum thickness of the internal polyethylene layer is preferably at least 0.5 mm.

In the multilayer polyethylene pipes according to the invention, the polyethylene compound having a resistance to stress cracking NPT of less than 8000 hours of the main layer can be any polyethylene compound. Applicants have found that a for this main layer polyethylene, the resistance to stress cracking NPT as described here above, may be lower than 5000 hours, even lower than 3000 hours.

Preferably the polyethylene compound having a resistance to stress cracking NPT of less than 8000 hours used for this main layer has a good creep resistance. The compounds used for this main layer preferably have a creep resistance which is such that they can be assigned a minimum required strength (MRS) rating according to the ISO/TR 9080 standard which is at least the MRS 8 rating (also designed as PE 80). Most preferably the compounds used for this layer have at least a MRS 10 rating. Furthermore, the polyethylene compounds used for this main layer of the pipes according to the invention preferably exhibit good resistance to rapid crack propagation (RCP). The compounds used in accordance with the invention preferably withstand a pressure of more than 10 bars at 0° C.

The polyethylene compound having a resistance to stress cracking NPT of less than 8000 hours used as main layer in the pipe according to the invention generally comprises at least 95% by weight of a polyethylene resin having a broad molecular weight distribution, a melt index $MI_5$ of between 0.07 and 10 g/10 min and a density measured according to ASTM D 792 standard between 930 to 965 kg/m$^3$, preferably between 940 to 960 kg/m$^3$. Preferably, the polyethylene resin of the main layer comprises from 30 to 70% by weight of a first ethylene polymer having a density of at least 960 kg/m$^3$ and an melt index $MI_2$ of at least 100 g/10 min and from 30 to 70% by weight of a second ethylene polymer comprising from 0.4 to 10 weight % of an alpha-olefin containing at least 4 carbon atoms (most preferably an ethylene-butene copolymer), having a density between 910 and 938 kg/m$^3$ and a melt index $MI_5$ of between 0.01 to 2 g/10 min.

The polyethylene compound used for the main layer may also comprise the usual additives used in polyethylene pipe compounds, such as stabilisers (anti-oxidants and/or anti-UV), antistatic agents, processing aids and colorants. Advantageously, the ethylene compound used for the main layer comprises less than 5% by weight of such additives.

The preferred polyethylene compounds having a resistance to stress cracking NPT of less than 8000 hours used as main layer of the pipes according to the invention are known, they are for example described in European patent application EP 0 603 935 and they are commercially available from Solvay Polyolefins Europe under the names of ELTEX®TUB 121, ELTEX®TUB 124 and ELTEX®TUB 125.

The thickness of the main polyethylene layer is preferably at least 50%, most preferably at least 60%, of the total pipe thickness. The thickness of the main layer preferably does not exceed 90% of the total pipe thickness.

Particularly preferred pipes according to the invention are those wherein a polyethylene compound having at least a MRS 10 rating of was used for the main layer of polyethylene and a polyethylene compound having at least a MRS 10 rating was used for the internal layer of polyethylene. By using such polyethylene compounds, the overall MRS rating of the pipe was also 10 or more.

The multilayered pipes according to the invention exhibit a very good resistance to point loading. The resistance to point loading of the pipes according to the invention was most often the same as the resistance of pipes of the same diameter and thickness made entirely of the polyethylene compound used for the internal layer.

The resistance to point loading of pipes can be examined by applying a point load (for example under the form of a piston having no sharp edges) against the external wall of the pipe and by measuring the rupture time of the pipes put under different internal pressures and/or temperatures. Such test was for example described by I. Uhi and F. Haizmann, in Wasser-Abwasser 141 (3), p. 142–4 (2000).

Besides the internal layer and the main layer, the pipes according to the invention can also comprise other layers of any other material. These layers can be disposed between the internal layer and the main layer and/or at the external side of the pipe.

Preferably the pipes according to the invention also comprise at least one external layer. The present invention also concerns pipes comprising in addition to the main layer and the internal layer such as described here above, an external layer having a good scratch resistance. Different materials having a good scratch resistance are known in the art. Such materials are for example reinforced polyolefins, such as glass fiber reinforced polyethylene, or crosslinked polyolefins.

In a first variant of this particular embodiment according to the invention, a crosslinked silane-grafted polyethylene compound was used as external layer. The use of crosslinked silane-grafted polyethylene compound as external layer has been described in European patent application EP 0 869 304. In this first variant it is preferred to use a crosslinked silane-grafted polyethylene compound having a crack resistance tested by the notched pipe test (NPT) in accordance with ISO 13479 (1996), such as described here above, of at least 5000 hours, most preferably of at least 8000 hours. The crosslinked silane-grafted polyethylene is generally obtained by exposition to water or moisture of a silane grafted polyethylene having a density of at least 943 kg/m$^3$ (preferably of at least 950 kg/m$^3$) and a melt index $MI_5$ between 0.05 and 5 g/10 min and containing from 0.10 to 0.24 of hydrolizable silanic groups per 100 $CH_2$ units. It is particularly preferred to use a crosslinkend silane grafted polyethylene compound having a MRS classification in accordance with ISO/TR 9080 of at least 10. Such a polyethylene compound is generally denoted by PEX 100 and is commercially available (ELTEX®TUX100 commercialised by Solvay Polyolefins Europe).

In a second and preferred variant of this particular embodiment according to the invention, a polyethylene compound having the same characteristics as the polyethylene compound used for the internal layer such as described here above is used for the external layer.

Hence, the polyethylene compound of the external layer preferably has a resistance to stress cracking NPT as described here above of higher than 8000 hours, more preferably of at least 10000 hours, and most preferably of at least 12000 hours. The polyethylene compounds of the external layer preferably have a creep resistance which is such that they can be assigned a minimum required strength (MRS) rating according to the ISO/TR 9080 standard which is at least the MRS 10 rating. Furthermore, the polyethylene compounds used for the external layer of the pipes according to the invention preferably exhibit good resistance to rapid crack propagation (RCP), such that they can withstand a pressure of more than 10 bars at 0° C. Preferably, the ethylene compounds used for the external layer of the pipes in accordance with the invention exhibit a time to failure under the FNCT test specified in ISO DIS 16770 of at least 500 hours, most preferably of at least 1000 hours. The polyethylene compound of the external layer used in the pipe according to the invention generally comprises at least 95% by weight of a polyethylene resin having a broad molecular weight distribution, a melt index $MI_5$ of between 0.07 and 10 g/10 min and a density measured according to ASTM D 792 standard between 930 to 965 kg/m$^3$, preferably between 940 to 960 kg/m$^3$. Preferably, the polyethylene resin of the external layer comprises from 30 to 70% by weight of an ethylene polymer having a density of at least 960 kg/m$^3$ and an melt index $MI_2$ of at least 100 g/10 min and from 30 to 70% by weight of an ethylene copolymer comprising from 0.4 to 10 weight % of alpha-olefin containing more than 5 carbon atoms (most preferably an ethylene-hexene copolymer), having a density between 910 and 938 kg/m$^3$ and a melt index $MI_5$ of between 0.01 to 2 g/10 min. The polyethylene compound used for the external layer may also comprise the usual additives used in polyethylene pipe compounds, such as stabilisers (anti-oxidants and/or anti-UV), antistatic agents, processing aids and colorants. Advantageously, the polyethylene compound used for the external layer comprises less than 5% by weight of such additives. The most preferred polyethylene compounds and resins used for the external layer of the pipes according to the invention are described in European patent application EP 0 897 934.

In this second variant it is particularly preferred to use the same polyethylene resin for both the internal and external layers of the pipe. The polyethylene compounds used for the internal and external layers of the pipe can comprise different colorants to fit particular purposes such as camera inspection for the inside layer and transport fluid identification for the external layer.

The pipes according to this second variant of this embodiment according to the invention present the additional advantage that they are easily recyclable and that they can easily be assembled by butt-fusion welding.

In a third and especially preferred variant of this embodiment according to the invention, the pipe comprises an internal layer and an external layer of polyethylene compound having a resistance to stress cracking NPT of at least 8000 hours and a MRS rating of 10 or higher and a main layer of polyethylene compound having a resistance to stress cracking NPT of lower than 8000 hours and a MRS rating of 10 or higher. By using such materials, the overall MRS classification of the pipe was also 10 or higher. Hence, pipes according to the invention could be used having the same diameter and thickness as pipes made of a single MRS 10 material.

The thickness of the external layer is generally comprised between 1 and 35% of the total pipe thickness, but not less than 0.3 mm. Preferably, the thickness of the external layer does not exceed 30% of the total pipe thickness. Preferably, the thickness of the external layer is at least 10%, most preferably at least 15%, of the total pipe thickness.

The pipes according to the invention, comprising also an external layer of material having good scratch resistance, and in particular those having a external layer having the same properties as the internal polyethylene layer, exhibit besides a good resistance to point loading, a very good resistance to stress cracking. The resistance to stress cracking of these pipes was most often the same as the resistance to stress cracking of pipes of the same diameter and thickness made entirely of the polyethylene used for the internal layer.

The pipes according to the invention are therefore well suited to be used as pipes for the transport of fluids under pressure such as water and gas. The pipes according to the invention present the advantage that they can be embedded in or posed on soils containing rocks and stones without great problems, even without the use of a (costly) sand bed.

The pipes according to the invention can be made by any process suited therefore. They are advantageously made by coextrusion of the polyethylene compounds included in the pipe.

Figure 2:
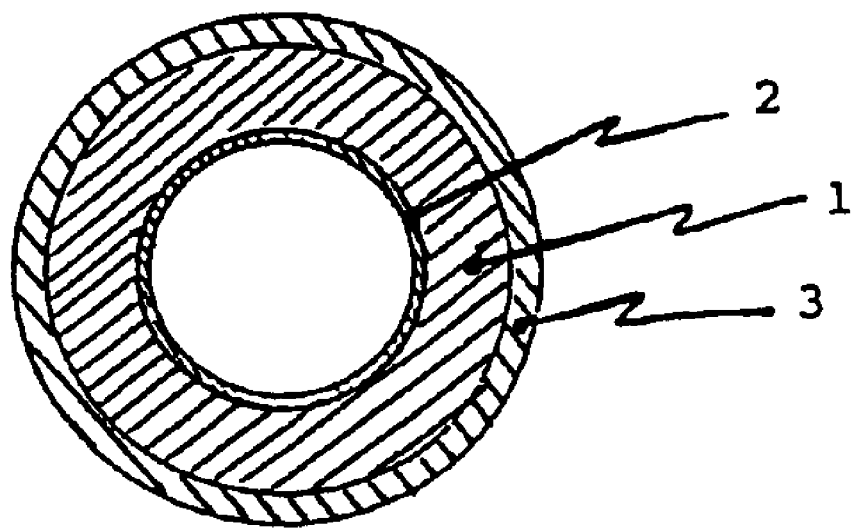

FIGS. 1 and 2 schematically illustrate pipes according to the invention.

In FIG. 1 a bi-layered pipe according to the invention is illustrated having a main layer (1) of polyethylene compound having a resistance to stress cracking NPT of less than 8000 hours and an internal layer (2) of polyethylene compound having a resistance to stress cracking NPT of higher than 8000 hours. In FIG. 2 a tri-layered pipe according to the invention is illustrated having a main layer (1) of polyethylene compound having a resistance to stress cracking NPT of less than 8000 hours, an internal layer (2) of polyethylene compound having a resistance to stress cracking NPT of higher than 8000 hours and an external layer (3).

EXAMPLE

A three-layered pipe of overall diameter 110 mm and thickness of 10 mm (SDR 11) according to the invention was manufactured by co-extrusion. The pipe comprised a internal layer and an external layer made of a polyethylene compound comprising a ethylene-hexene copolymer such as described in example 8 of EP 0 897 934. This compound had a MRS classification of 10 and a resistance to stress cracking NPT measured according to the ISO 13479 standard of more than 12000 hours. The thickness of the internal layer was 1 mm; the thickness of the external layer was 2.5 mm. Between these two layers was a main layer (having a thickness of 6.5 mm) made of polyethylene compound (comprising an ethylene-butene copolymer) commercialised by Solvay Polyolefins Europe under the name of ELTEX®TUB 124. This polyethylene compound had a MRS classification of 10 and a resistance to stress cracking NPT measured according to the ISO 13479 standard of about 1800 hours.

The properties of the pipe were measured and are presented in table I.

COMPARATIVE EXAMPLE

A pipe of the same overall diameter and thickness as the one described in the example here above was made but consisting entirely of the polyethylene compound commercialised by Solvay Polyolefins Europe under the name of ELTEX®TUB 124.

The properties of the pipe were measured and are presented in table I.

|  | Example | Comparative Example |
| --- | --- | --- |
| MRS classification | 10 | 10 |
| resistance to stress cracking measured according to NPT standard | >8000 hours | 1800 hours |
| resistance to point loading | >8000 hours | ~1500 hours |

The comparison of the results presented in Table I show that the pipe according to the invention although containing as major layer a polyethylene compound having a relatively low resistance to stress cracking, has a very good resistance to stress cracking and a much better resistance to point loading.

What is claimed is:

1. Multi-layered pipe comprising a main layer of polyethylene compound having a resistance to stress cracking NPT measured according to ISO 13479 standard of less than 8000 hours and an internal layer of polyethylene compound having a resistance to stress cracking NPT of higher than 8000 hours, the thickness of the internal layer being between 1 and 25% of the total pipe thickness but not less than 0.3 mm.

2. Pipe according to claim 1, wherein the polyethylene compound of the internal layer has a resistance to stress cracking NPT of at least 10000 hours.

3. Pipe according to claim 1, wherein the polyethylene compound of the internal layer has a MRS classification according to ISO/TR 9080 standard of at least 10.

4. Pipe according to claim 1, wherein the polyethylene compound of the internal layer comprises at least 95% by weight of a polyethylene resin comprising from 30 to 70% by weight of an ethylene polymer having a density of at least 960 kg/m$^3$ and a melt index MI$_2$ of at least 100 g/10 min and from 30 to 70% by weight of an ethylene-hexene copolymer comprising from 0.4 to 10 weight % of hexene, having a density between 910 and 938 kg/m$^3$ and a melt index MI$_5$ of between 0.01 to 2 g/10 min.

5. Pipe according to claim 1, wherein the polyethylene compound of the main layer has a MRS classification according to ISO/TR 9080 standard of at least 10.

6. Pipe according to claim 1, wherein the pipe comprises an external layer having an improved scratch resistance.

7. Pipe according to claim 6, wherein the external layer comprises a crosslinked silane-grafted polyethylene compound.

8. Pipe according to claim 6, wherein the external layer comprises a polyethylene compound having a resistance to stress cracking NPT measured according to ISO 13479 standard of higher than 8000 hours.

9. Pipe according to claim 6, wherein the internal layer, the main layer and the external layer comprise a polyethylene compound having a MRS classification of at least 10.

10. Pipe according to claim 6, wherein the thickness of the external layer is between 1 and 35% of the total pipe thickness but not less than 0.3 mm.

* * * * *